April 5, 1966     W. F. ALTENPOHL, JR     3,243,841
POULTRY SHACKLE FOR OVERHEAD CONVEYOR AND CARRIAGE ASSEMBLY
Original Filed Sept. 13, 1961     4 Sheets-Sheet 1
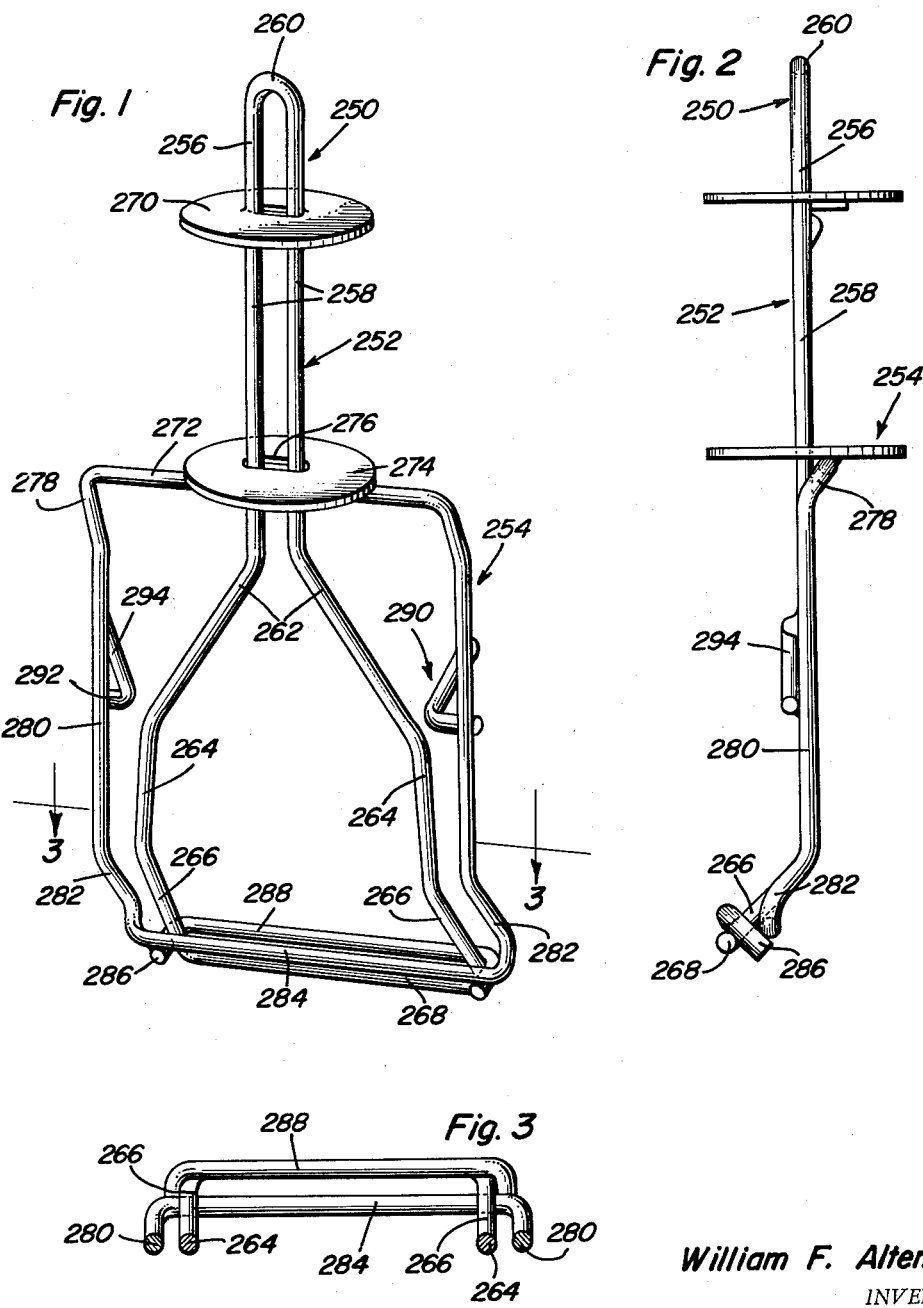
William F. Altenpohl, Jr.
INVENTOR.

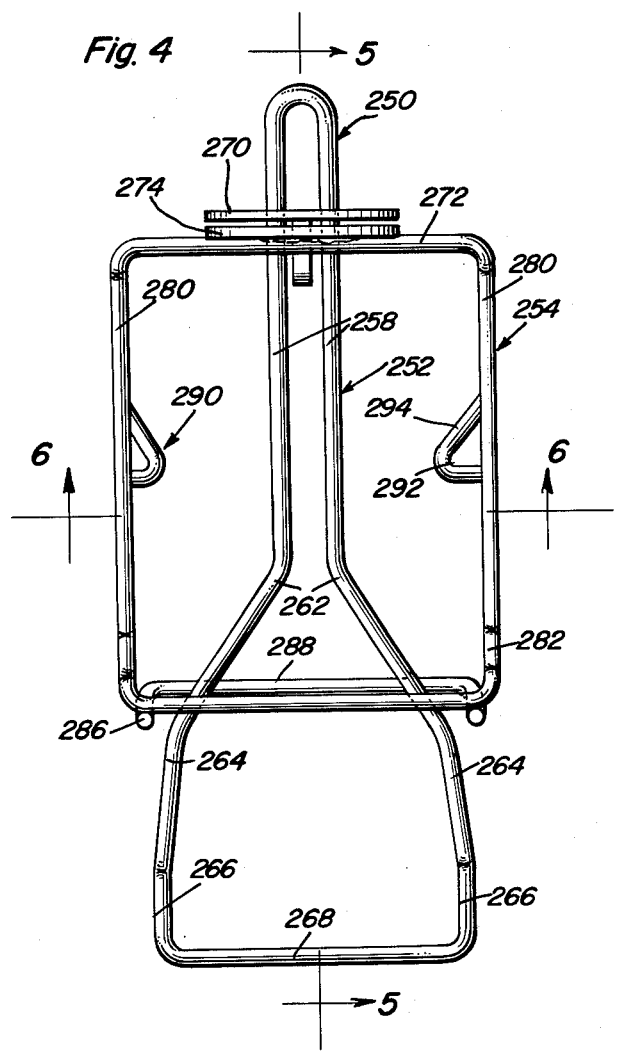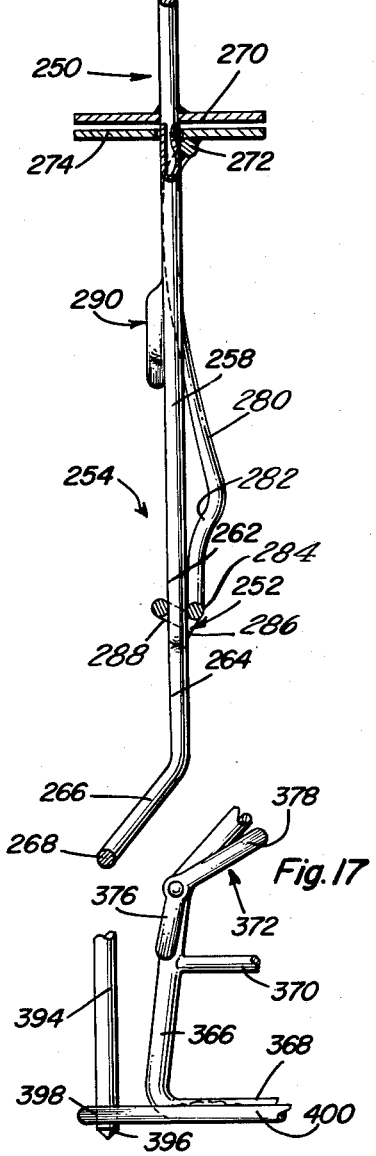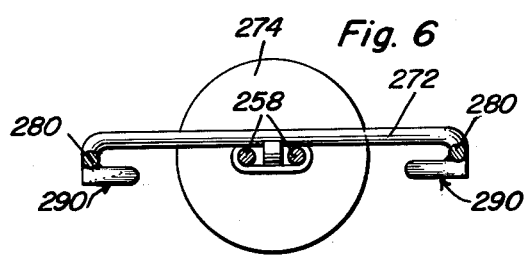
William F. Altenpohl, Jr.
INVENTOR.

April 5, 1966   W. F. ALTENPOHL, JR   3,243,841
POULTRY SHACKLE FOR OVERHEAD CONVEYOR AND CARRIAGE ASSEMBLY
Original Filed Sept. 13, 1961   4 Sheets-Sheet 3
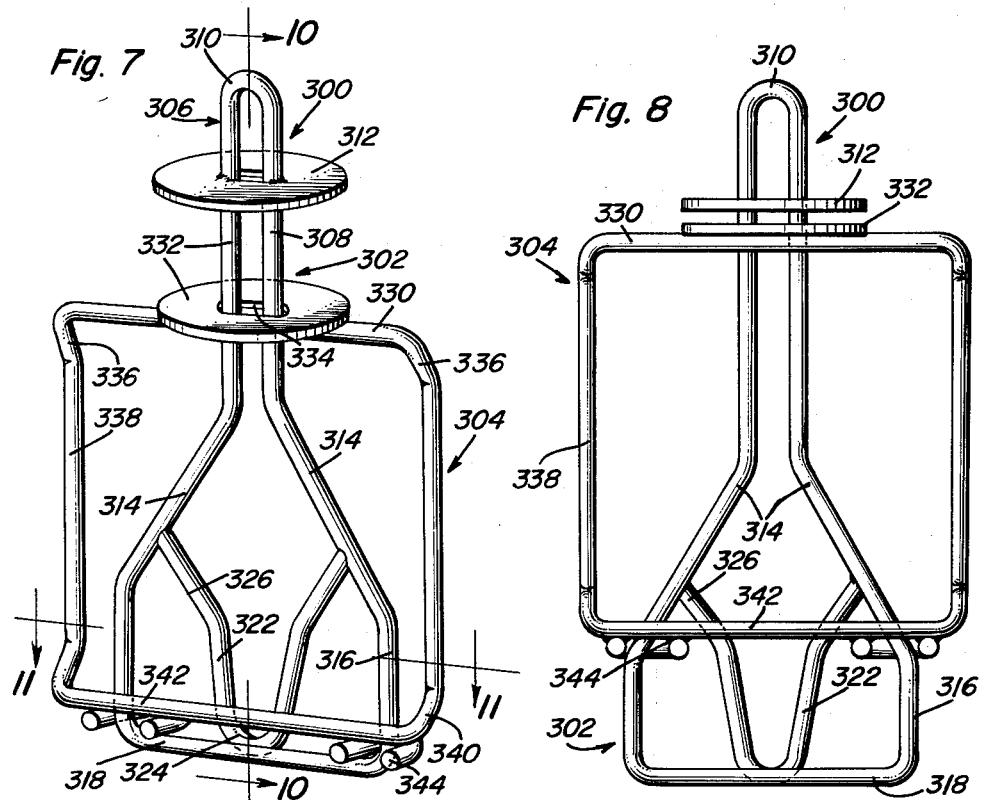
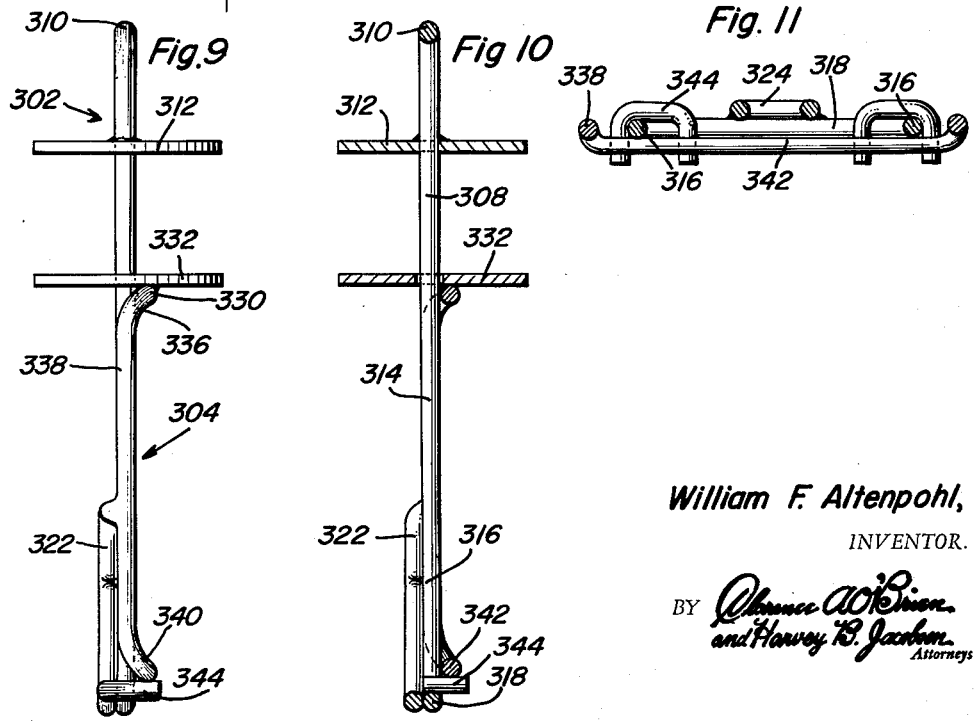
William F. Altenpohl, Jr.
INVENTOR.

April 5, 1966  W. F. ALTENPOHL, JR  3,243,841
POULTRY SHACKLE FOR OVERHEAD CONVEYOR AND CARRIAGE ASSEMBLY
Original Filed Sept. 13, 1961  4 Sheets-Sheet 4
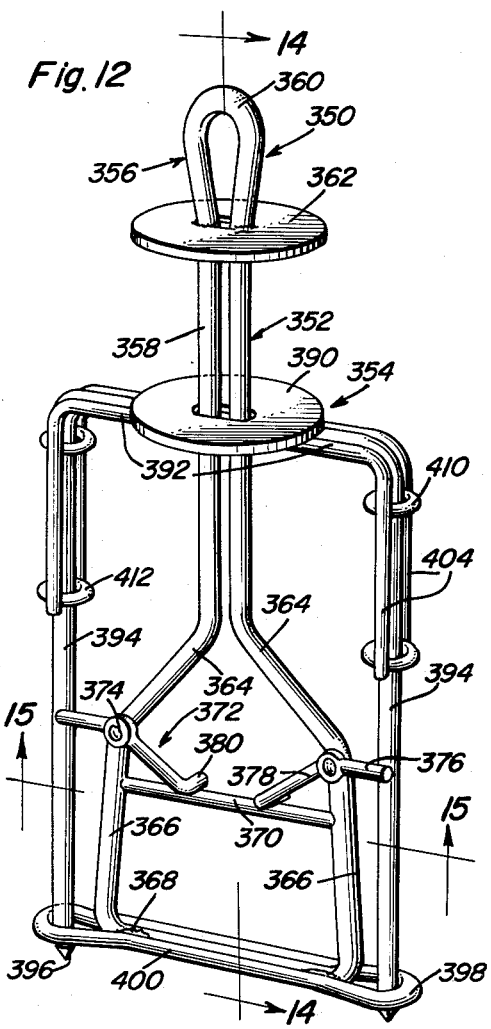
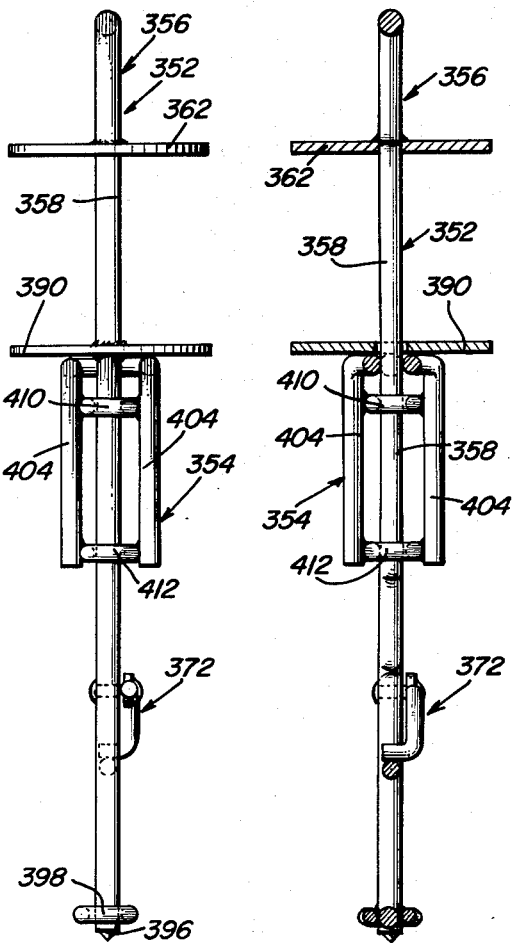
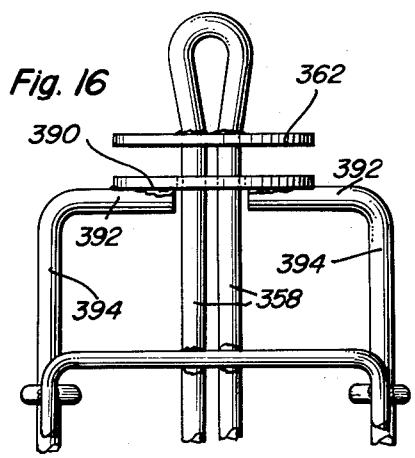
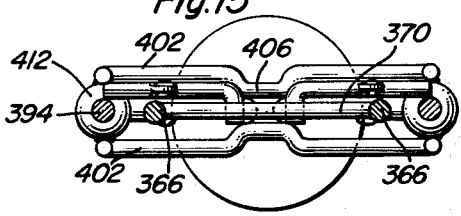
William F. Altenpohl, Jr.
INVENTOR.
BY
Attorneys

United States Patent Office

3,243,841
Patented Apr. 5, 1966

3,243,841
POULTRY SHACKLE FOR OVERHEAD CONVEYOR AND CARRIAGE ASSEMBLY
William F. Altenpohl, Jr., West Conshohocken, Pa., assignor to W. F. Altenpohl, Inc., a corporation of Pennsylvania
Original application Sept. 13, 1961, Ser. No. 137,815, now Patent No. 3,132,373, dated May 12, 1964. Divided and this application Mar. 27, 1964, Ser. No. 355,328
9 Claims. (Cl. 17—44.1)

This application constitutes a division of my prior copending application, Serial No. 137,815, filed September 13, 1961 and bearing the same title, now Patent No. 3,132,373.

This invention comprises a novel and useful poultry shackle for overhead conveyor and carriage assemblies and more particularly pertains to a shackle specifically adapted for the supporting of poultry or the like during the processes of killing, dressing and eviscerating the fowl.

The primary object of this invention is to provide a poultry shackle construction for use with a carriage or hanger assembly for conveniently supporting poultry for transport by an overhead conveyor system during the performing of varying operations upon poultry.

A further object of the invention is to provide a carriage assembly for supporting poultry upon an overhead conveyor system, whereby the poultry may be supported in different positions by the shackle and carriage and may be thereby transported to different stations for treatment of the poultry.

A further object of the invention is to provide a poultry supporting shackle of a relatively simple construction, that shall be easy to load or unload and which will support the poultry carried thereby in a three-point suspension, when desired.

A still further important object of the invention is to provide an improved poultry shackle in accordance with the preceding objects which shall secure a firm gripping engagement upon the legs of the poultry to securely hold and carry the same and wherein the weight of the poultry will serve to even more securely retain the legs in the shackle together with means facilitating release of the poultry from the shackle when desired.

An additional object of the invention is to provide a poultry shackle construction in accordance with the foregoing objects which shall be readily fabricated from rod-like material and shall avoid insofar as possible the formation of corners or sharp or recessed surfaces on the shackle in order to thereby facilitate sanitation and the sterilizing of the shackles.

It is a further and more specific object of the invention to provide improved constructions of poultry supporting shackles particularly adapted for being dependingly carried by an overhead conveyor system for transporting poultry to different stations for treatment thereof and which shackles shall consist of a pair of frames slidably connected together and wherein one frame comprises a vertically elongated support body for attachment to the overhead conveyor system and the other comprises a holder means, the frames cooperating with each other to provide pockets for receiving extremities of poultry and wherein relative movement between the frames will effect the ready release of the poultry extremities therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1-6 illustrate a first embodiment of a shackle in accordance with the invention, wherein:

FIGURE 1 is a perspective view of a shackle specifically adapted as a shackle for supporting live poultry in preparation for killing the poultry in an overhead conveyor system;

FIGURE 2 is an end elevational view of the shackle of FIGURE 1 from the left side thereof;

FIGURE 3 is a horizontal sectional view taken substantially upon a plane indicated by the section line 3—3 of FIGURE 1;

FIGURE 4 is a view similar to FIGURE 1 but showing the shackle components in a poultry releasing position;

FIGURE 5 is a view in vertical central transverse section taken substantially upon the plane indicated by the section line 5—5 of FIGURE 4;

FIGURE 6 is a horizontal sectional detail view taken substantially upon the plane indicated by the section line 6—6 of FIGURE 4;

FIGURES 7-11 illustrate a second embodiment of a poultry shackle wherein:

FIGURE 7 is a perspective view of a shackle specifically intended to function as a shackle for supporting poultry during eviscerating operations thereon with the shackle being shown in its closed position for retaining poultry therein;

FIGURE 8 is a front elevational view of the shackle of FIGURE 7 but with the parts moved to the poultry releasing position of the shackle;

FIGURE 9 is an end elevational view of the shackle of FIGURE 7;

FIGURE 10 is a vertical central transverse sectional view taken substantially upon the plane indicated by the section line 10—10 of FIGURE 7;

FIGURE 11 is a horizontal sectional detail view taken substantially upon the plane indicated by the section line 11—11 of FIGURE 7;

FIGURES 12-17 illustrate a third embodiment of a poultry shackle wherein:

FIGURE 12 is a perspective view of a form of shackle specifically adapted for use in holding live poultry for killing the latter and with the shackle being shown in its poultry holding position;

FIGURE 13 is an end elevational view of the shackle of FIGURE 12, being taken from the left end thereof;

FIGURE 14 is a view in vertical central transverse section taken substantially upon the plane indicated by the section line 14—14 of FIGURE 12;

FIGURE 15 is a horizontal sectional detail view taken substantially upon the plane indicated by the section line 15—15 of FIGURE 12;

FIGURE 16 is a fragmentary elevational view of the upper portion of the shackle of FIGURE 12 but showing the position of the parts when the shackle is moved into the poultry releasing position; and FIGURE 17 is a detail view in elevation of a portion of the left side of the shackle of FIGURE 12 but showing the poultry retaining pivot means thereof in a poultry releasing position.

The poultry shackles disclosed and claimed herein are adapted specifically for use with an overhead poultry conveyor system of the type described in detail in my above copending application. FIGURES 1-17 of this application constitute FIGURES 24-40, respectively, of my copending application. In order to facilitate a comparison of the shackles disclosed in this application with those of my prior copending application, the same reference numerals have been applied to the shackles of this application.

Referring first to the embodiment of FIGURES 1-6 which discloses a form of shackle specifically adapted for supporting chickens and other fowls in preparation for killing the same, it will be observed that this form of shackle is indicated generally by the numeral 250 and consists of two relatively movable components, these comprising a relatively stationary inner component indicated generally by the numeral 252 and a relatively movable outer component designated generally at 254. Each of these components is preferably although not necessarily of a rod-like or wire-like construction, consisting of a single rod-like element appropriately shaped and formed.

The stationary inner component 252 which also constitutes the means for supporting the shackle from the carriage or carrier member of the conveyor chain system has an upwardly projecting stem 256, the latter comprising a pair of parallel rod portions 258 joined at their upper ends by integral loop or web 260. At their lower ends the portions 258 have outwardly and downwardly divergent portions 262 which at their lower ends are again angulated to provide downwardly and outwardly divergent portions 264 forming a lesser included angle than that of the portions 262. These last-mentioned portions 264 at their lower ends are again angulated as at 266 in planes which are perpendicular to the plane of the portions 264 as will be better apparent from a comparison of FIGURES 4 and 5. Finally, the portions 266 at their lower ends are integrally connected by a horizontally extending cross member or bar 268. Rigidly secured to the stem 256 as by welding or the like is a surrounding disk 270 which constitutes a fingergrip means for the stationary component of the shackle.

The outer and movable component 254 of the shackle comprises a horizontal crossbar 272 which is welded or otherwise secured to the underside of a circular disk 274 which is complementary to the fingertip 270 and constitutes a fingergrip portion for the movable component of the shackle. This disk has an aperture 276 therethrough which slidably embraces the stem 256 of the stationary component 252.

Depending from the opposite ends of the cross member 272 of the movable component 254 are the downturned and slightly angulated portions 278 from which depend parallel vertical portions 280.

The lower ends of the straight parallel portions 280 have angulated portions 282 which are joined at their lower ends by a crossbar 284. The crossbar 284 has secured thereto as by welding on the underside thereof the parallel angulated end portions 286 of a further crossbar 288 which is parallel to the bar 284. There is thus provided an opening or a slot between the two crossbars 284 and 288 in which is slidably received the lower portion of the stationary frame component 252.

Secured to the sides of the vertical portions 280 of the movable shackle component as by welding or the like are a pair of inwardly projecting members comprising locking jaws and which are indicated generally by the numeral 290. Each of the elements 290 comprises a substantially horizontal portion 292 and an upwardly outwardly inclined portion 294.

The arrangement is such that in this form of the shackle, the two fingergrip members 270 and 272 may be slightly moved toward each other a sufficient distance to cause the movable component 254 to lift the locking jaw 290 a sufficient distance from the stationary components to permit the passage of the legs of a chicken downwardly into the space between the portions 280 and 264. This space is wedge-shaped so that the weight of the fowl will serve to further wedge and retain the legs therein. The chicken, hung in this position, is then ready for butchering. When it is desired to disengage the chicken it is merely necessary to manually or otherwise lift or move the fingergrip portion 274 toward the fingergrip portion 270 thus elevating the movable component 254 relative to the stationary component, to the position shown in FIGURE 4, at which time ample space is provided between the stationary movable components to effect the release of the fowl therefrom by gravity.

*Embodiment of FIGURES 7–11*

Reference is next made to a modified embodiment of shackle shown in FIGURES 7–11 which is specifically adapted for use in supporting poultry for evisceration thereof. This form of shackle somewhat resembles that of the preceding embodiment of FIGURES 1–6 in that it consists of two relatively movable wirelike components assembled together. This embodiment of the invention indicated generally by the numeral 300 likewise includes an inner relatively stationary component 302 and a relatively movable outer component 304. The stationary component includes a stem 306 consisting of a pair of parallel portions 308 which are integrally connected at their upper ends as by a loop portion 310 which is welded or otherwise secured to the stem and constitutes a fingergrip means as set forth hereinafter.

In this form of the invention, the entire structure of the stationary component 302 lies in the same vertical plane as will be apparent from a consideration of FIGURES 32 and 33. At their lower ends the parallel portions 308 have downwardly and outwardly divergent portions 314 whose lower ends terminate in parallel portions 316 integrally joined by a cross member 318. A rod-like brace member 320 is welded or secured to the lower end of the stationary component 302, and consists of an upwardly divergent V-shaped lower member 322 whose lower end constitutes a loop 324 which is welded to the cross member 318, and its upper ends constitute divergent legs 326, each of which is welded to one portion 314. The V-shaped member 322 constitutes a means for receiving and retaining the neck or head of poultry therein.

The movable outer component 304 comprises a generally rectangular framework including a horizontal top member 330 secured to a circular disk 332 comprising a fingergrip member and which is apertured as at 334 to slidingly embrace the stem 306 of the stationary component for guided sliding movement thereon.

At its extremities, the cross member 330 has parallel vertically depending but slightly angulated portions 336 which as shown in FIGURES 9 and 10 compensate for the disposition of the member 330 to one side of the stem portion 306. Depending from the portions 336 are parallel vertically depending portions 338 which lie in the same vertical plane as that which contains the portions 308, 314 and 316 of the stationary component 302. At their lower ends, the portions 338 are again provided with angulated portions 340 of slightly greater extent and in the same direction as the portion 336 so that the integral transverse bar 342 carried thereby may slidably engage the same side of the stationary component 302. This relationship will be readily apparent from a consideration of FIGURES 9, 10 and 11 in conjunction with FIGURE 7. Secured to the crossbar 342 of the movable component 304 is a pair of U-shaped guide members 344 which embrace and slidingly and guidingly retain between themselves and the crossbar 342, the portions 316 of the stationary component 302. In addition, the legs of the U-shaped members 344 are adapted to abut upon the crossbar 318 of the stationary components and thus constitute a stop means limiting relative sliding movement of the movable component with respect to the stationary component.

The operation of this form of shackle is as follows:

The two components of the shackle will normally be in the position shown in FIGURE 7 under the influence of gravity. At this time, the legs of the fowl may be thrust into the V-shaped or wedge-shaped opening lying between the portions 338 and 316, with the inclined portion 314 facilitating the guiding of the legs thereinto. The head of the fowl may likewise be disposed in the V-shaped member 322 so that the fowl may be hung by its head and legs in a substantially horizontal position. Alternatively, the head may be permitted to hang downwardly if desired and the fowl be supported solely by its legs.

When it is desired to release the fowl from the shackle, it is merely necessary to manually or by mechanical means cause movement of the fingergrip members 312 and 332 toward each other, thereby lifting the movable component 304. As will be noted, the lifting movement is constrained by a complete guiding action between the components because of the guided opening 334 of the fingergrip member 332 on the stem 306 of the stationary component and the sliding engagement of the U-shaped guide member 344 on the portions 316 of the stationary component.

*Modification of FIGURES 12–17*

Attention is next directed to the third modified construction of shackle shown in FIGURES 12–17 and which is particularly adapted for use in supporting fowls for killing the same. This form of shackle likewise is of a rod-like construction and is indicated generally by the numeral 350. This form of the invention is likewise of rod-like configuration including a stationary component 352 and a movable component 354. The stationary component includes the supporting stem 356 having parallel portions or leg members 358 which are joined by a supporting loop 360 at their upper ends. Surrounding the stem adjacent the loop is a circular disk 362 which comprises a fingergrip portion.

At their lower ends, the leg portions 358 have downwardly and outwardly divergent portions 364 and terminate in outwardly divergent portions 366 which are integrally connected by a crossbar 368. All portions of the frame of the stationary component 352 lie in the same vertical plane as will be apparent from FIGURES 13 and 14.

A transverse bar 370 is connected through and extends between the portions 366 and serves to both brace and reinforce the portion of the stationary component and also to constitute a stop means for a movable jaw as set forth hereinafter.

A pair of pivoted levers each indicated generally by the numeral 372 is mounted upon the stationary component. The levers are bellcrank members having a central portion pivoted as at 374 to the stationary component at the junction of the portions 364 and 366 thereof. Each lever 372 includes a lever arm 376 and an actuating arm 378 which is angulated with respect to the arm 376. This actuating arm in turn has an end portion 380 which projects laterally therefrom and overlies the crossbar 370 in order to engage the same and thus limit pivoting movement of the lever in one direction.

The movable component of the shackle includes a circular disk 390 which is apertured as shown to slidably and guidingly embrace the stem 356. Secured to the underside of the fingergrip member 390 by welding or the like are the horizontal upper end portions 392 of a pair of parallel vertical members 394. This construction is shown best in FIGURE 16. At their lower ends it will be observed that the members 394 are pointed as at 396 and are guidingly received in the looped end portions 398 of a band or strap 400 which embraces the opposite sides of the stationary frame bottom cross member 368, as by being welded thereto. These loop portions constitute guides for the lower ends of the rods 394 of the movable component of the shackle.

Guide means are likewise provided for the upper ends of the rods 394. For this purpose there is provided and shown more clearly in FIGURE 15 a pair of cross rods having horizontal portions 402 having each at its end a downturned vertically extending portion 404. The midportions of the rods 402 are inwardly offset toward each other to provide mounting portions 406 which are welded or otherwise fixedly secured to the two legs 358 of the stem portion 356 of the stationary component. The downwardly projecting portions 404 are each provided with a pair of rings 410 and 412 which loosely embrace and thus slidably guide the upper portions of the rods 394. It will thus be seen that the guide rings 410 and 412 are rigidly attached to the elements 404, 402 and are attached therewith to the stationary component 352 by engagement of the portions 406.

The operation of this form of shackle is as follows:

The effect of gravity will normally urge the movable component to its lowered position as shown in FIGURE 12. Likewise gravity will urge the levers 372 so that their terminal portions 380 will stop and bear against the cross member 370 with the arms 376 of the levers lying across the space between the members 366 and 394. This is the normal position of the device in readiness for use. When it is desired to insert the legs of the fowl into the wedge-shaped spaces defined between the portions 366 and 394, it is merely necessary to press the legs down upon the arms 376 which in turn will appropriately pivot the levers 372 to permit such passage of the legs of the fowl therepast. Thereafter the weight of levers will cause the arms 376 to again move across the wedge-shaped opening and block upward removal and release of the legs therefrom. As will be noted, the members 380 bearing upon the crossbar 370 will positively lock the levers against movement which will uncover the upper end of the wedge-shaped leg receiving spaces.

When it is desired to release the fowl from the shackle it is merely necessary to manually or mechanically move the fingergrip member 390 toward the fingergrip member 362. This relative upward sliding movement will lift the rods 394, causing them to slide in their guide rings 410 and 412 and disengage the lower ends of the rods from the guide loops 398. This in turn will release or uncover the lower ends of the wedge-shaped passages so that the legs will be readily removed therefrom.

FIGURE 16 indicates the raised position of the movable component with respect to the stationary component while FIGURE 17 indicates the pivoting movement of the levers 372 as the leg of a fowl is passed downwardly into the wedge-shaped leg receiving space between the lower ends of the two components.

Although the foregoing specification and accompanying drawings particularly disclose, describe and illustrate the specific adaptation and use of the various forms of shackles to support, position and convey poultry, it will be understood that the invention is also of utility as a means for supporting and conveying other articles in a similar manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a poultry carrier system of the overhead conveyor type, a poultry shackle comprising a vertically extending support body having means for mounting said body in dependent relation from an overhead conveyor, holding means movably mounted upon said body and cooperating therewith for releasably securing an extremity of a fowl therebetween, said holding means and said body having cooperating downwardly convergent opposed surfaces defining divergent pockets for wedgingly retaining by gravity the extremity of a fowl disposed therein, means to impart upward motion to said holding means to provide relative movement of said opposed surfaces to release the wedging engagement of the latter upon said fowl extremity, and guide means mounted by the support body and holding means adjacent to said pockets for guiding movement of the holding means relative to the support body.

2. The combination of claim 1 wherein said body and holding means are of rod-like construction.

3. A poultry shackle for a poultry conveyor system of the overhead type comprising vertically elongated support body and holder means each comprising a rod-like frame and means mounting said holder means on said body for guided, vertical sliding movement, said holding means and body having pairs of cooperating, opposed downwardly convergent surfaces for wedgingly retaining under the influence of gravity the extremity of a fowl when placed therein and operable upon relative sliding movement to release said fowl extremity, and guide means connected to one surface of each of said pairs of surfaces for sliding contact with the other surface of each of said pairs of surfaces.

4. The combination of claim 3 wherein one of said frames has angulated portions defining one of said opposed surfaces and the other frame has a projection extending toward said angulated portions and cooperating therewith in the relative lowered position thereof to block egress of said extremity therefrom.

5. The combination of claim 4 including plates disposed in vertically spaced relation upon said frames and comprising handgrip means for effecting sliding movement of said frames to release poultry held by said opposing surfaces.

6. The combination of claim 3 wherein each frame consists of a single rod-like element, said mounting means being mounted upon the upper and lower ends of said holder means and guidingly and slidingly embracing said support body.

7. The combination of claim 6 wherein the frames lie substantially in parallel vertical planes with their lower ends lying substantially in parallel planes inclined to said vertical planes.

8. The combination of claim 6 wherein one of said frames has mounted thereon a retaining means extending toward the other frame and operable in the lowered position of the movable frame to block passage of a fowl extremity from between said opposed surfaces.

9. A poultry shackle comprising inner and outer relatively movable frames connected together for guided vertical sliding movement, each frame having a pair of vertically extending side walls with the adjacent side walls of both frames providing therebetween pockets open at their tops, pivoted closures for the top of said pockets biased to pocket closing position but movable to pocket opening position by passage of a fowl extremity through said open top and into said pockets, each lever being pivotally carried by a side wall, one of said frames including a bottom for said pockets.

References Cited by the Examiner

UNITED STATES PATENTS

| | | | |
|---|---|---|---|
| 2,819,489 | 1/1958 | Shadley | 17—44.1 |
| 2,990,573 | 7/1961 | Pitts et al. | 17—44.1 |
| 3,044,109 | 7/1962 | Wayne | 17—44.1 |

FOREIGN PATENTS 136,525   1/1962   Russia.

MELVIN D. REIN, *Primary Examiner.*

LUCIE H. LAUDENSLAGER, *Examiner.*